United States Patent [19]

Sexsmith et al.

[11] 4,195,140

[45] Mar. 25, 1980

[54] ADHESIVE-PROMOTING COMPOSITIONS

[75] Inventors: Frederick H. Sexsmith, Erie; E. Chris Hornaman, Girard, both of Pa.

[73] Assignee: Lord Corporation, Erie, Pa.

[21] Appl. No.: 958,081

[22] Filed: Nov. 6, 1978

Related U.S. Application Data

[60] Division of Ser. No. 882,035, Feb. 28, 1978, which is a continuation-in-part of Ser. No. 659,976, Feb. 18, 1976, abandoned.

[51] Int. Cl.² ............................................. C08L 63/00
[52] U.S. Cl. ..................................................... 525/523
[58] Field of Search ............... 260/831; 525/481, 939, 525/523; 528/155

[56] References Cited

U.S. PATENT DOCUMENTS

| 3,200,172 | 8/1965 | Renner | 260/831 |
|---|---|---|---|
| 3,337,509 | 8/1967 | Budnowski | 260/77.5 |
| 3,496,122 | 2/1970 | Niklaus | 260/831 |
| 3,632,665 | 1/1972 | Aggias | 260/831 |
| 3,725,501 | 4/1973 | Hilbelink | 525/939 |

FOREIGN PATENT DOCUMENTS

| 45-29390 | 9/1970 | Japan | 260/831 |
|---|---|---|---|
| 47-35069 | 9/1972 | Japan | 260/831 |
| 768125 | 2/1957 | United Kingdom | 260/831 |

OTHER PUBLICATIONS

Lee et al. Handbook of Epoxy Resins, McGraw-Hill Book Co., New York, (1967) pp. 25-30 and 25-31.

*Primary Examiner*—Paul Lieberman
*Attorney, Agent, or Firm*—John A. Gazewood

[57] ABSTRACT

Adhesion of organic polymer-based compositions to substrate surfaces is enhanced by incorporating into such organic polymer-based compositions an effective amount of an admixture comprising at least one phenolic novolak resin, at least one polyepoxide, and an effective amount of at least one crosslinking agent. The organic polymer-based compositions containing the described admixtures are bonded to metal and other substrates over a wide temperature range, including temperatures substantially below the activation temperatures at which prior art adhesion promoters are most effective.

5 Claims, No Drawings

ADHESIVE-PROMOTING COMPOSITIONS

This is a division of application Ser. No. 882,035; filed Feb. 28, 1978 as a continuation of application Ser. No. 659,976; filed Feb. 18, 1976, and now abandoned.

This invention relates to materials which are useful for improving adhesion between organic polymer-based compositions and substrate surfaces. More particularly, the invention relates to adhesion promoting compositions comprising certain heat-activated crosslinking systems which can be easily incorporated into organic polymer-based compositions to enhance the adhesion of such organic polymer-based compositions to rigid and non-rigid substrates.

The use of organic polymer-based compositions in the form of coatings, castings, laminates, adhesives, foams, molded objects, and the like, is well-known. A major problem associated with the use of such compositions in combination with rigid and non-rigid substrates, such as metals, natural and synthetic elastomers, natural and synthetic organic and inorganic fibers, formed plastic substrates, and the like, is the limited adhesion of the organic polymeric material to the substrate.

Many solutions have been proposed in the effort to overcome the limited adhesion problem, including pretreatment of the metal or other substrate material, such as physical alteration of the surface by roughening, etching, or the like; coating the surface with a primer coat; applying a primer coat followed by the application of adhesive and/or other intermediate coating compositions; or combinations of these surface treatments.

To avoid the necessity of pretreating the substrate, using primers, adhesives, and the like, there have been developed various additive materials which are incorporated into the organic polymer-based compositions to thereby promote adherence to metals and other substrates. Exemplary adhesion-promoting additives are disclosed in U.S. Pat. Nos. 2,835,624; 3,376,246; and 3,390,115. Chemical modification of the polymeric material, as by the introduction of functional moieties into the polymer structure, has also been proposed, as in U.S. Pat. No. 3,282,215.

While such measures have provided relief, they are not without their drawbacks. For example, surface treatments can result in weakened structures, significantly increase costs, and do not generally influence the requirements for fusion temperature and time. While the use of additives and/or chemically-modified polymeric materials can be effective to eliminate the need for surface treatments, as well as improving adhesion, the use of such materials is not without drawbacks. For example, the production of volatile materials during curing or fusion can cause foaming of the polymer-based compositions. Many have limited shelf-stability, are not effective over wide temperature ranges or require high activating temperatures which can degrade the base polymer, cause corrosion of the substrate, discoloration of the product, or otherwise deleteriously affect the base polymer composition and/or substrate.

There thus remains a need for easily utilized means for improving the adhesion between organic polymer-based compositions and rigid and non-rigid substrates. Preferably, such means should have the capability of enhancing the adhesion to substrates not only of solid materials such as films, but also of unformed polymeric compositions such as plasticized materials and powders. It is equally desirable that such means be capable of enhancing bonding of the polymer-based composition to the substrate at as low an activation temperature as is possible.

It is an object of this invention to provide novel compositions which are capable of improving adhesion between organic polymer-based composition and substrate surfaces. It is another object of this invention to provide novel compositions which are easily incorporated into organic polymer compositions and which, upon the application of heat, react chemically to enhance the bond between the polymer composition and the substrate. It is a particular object of the invention to provide easily prepared organic polymer compositions including vinyl organosol, plastisol and dry powder compositions, which exhibit improved adhesion to a variety of rigid and non-rigid substrates. These and other objects, aspects and advantages of the invention will be apparent from the following description and appended claims.

In accordance with the present invention, there are provided adhesion-promoting compositions suitable for use in enhancing adhesion between organic polymeric materials and rigid or non-rigid substrates. The invention provides also methods for enhancing adhesion between organic polymeric materials and substrate surfaces. The invention further provides adhesive compositions which are useful in bonding substrate materials to each other to form laminates, composite articles, and the like.

In a first and preferred aspect, the adhesion promoting compositions of the present invention comprise
  (a) at least one phenolic novolak resin;
  (b) at least one polyepoxide characterized by the presence of at least two epoxy groups; and
  (c) an effective amount of at least one crosslinking agent.

The phenolic novolak resins which are suitable for use in the practice of the invention are well-known acid catalyzed phenol-aldehyde condensates. Such resins are prepared according to well-known methods by condensing phenolic compounds and aldehydes in the presence of an acid such as oxalic acid, sulfuric acid, hydrochloric acid, and the like, or in the presence of a metal salt such as zinc acetate, wherein the phenolic material is present in the reaction mixture in more than stoichiometric amounts. For more detailed information regarding novolak resins, including methods of preparation, see Carswell, "Phenoplasts", Interscience Publishers, Inc., New York, N.Y., (1947), which treatise is herein incorporated by reference. Novolak resins are permanently fusible and are not converted to an infusible, crosslinked state by the application of heat alone. Novolak resins can be converted to an infusible state by the addition thereto of a crosslinking agent such as a methylene donor.

In forming the phenolic novolak resins which are employed in the practice of this invention there can be employed a variety of phenolic compounds, i.e., both mono- and poly-substituted hydroxy benzenes, including such compounds having at least one aromatic nucleus, and substituted derivatives thereof. Among the substituent groups which can be attached to the nucleus of the phenolic compounds are alkyl, alkoxy, amino, halogen and the like. In general the phenols contain from 6 to 22 carbon atoms, preferably 6 to 15 carbon atoms. Representative phenolic compounds include, without limitation thereto, phenol, p-t-butylphenol, p-phenylphenol, p-chlorophenol, p-alkoxyphenol, o- cresol, m-cresol, o-chlorophenol, m-bromophenol, 2-ethylphenol, resorcinol, orcinol, phloroglucinol, pyrocatechol, pyrogallol, salicylic acid, bis-phenol A, and the like. Polyphenols having the hydroxy groups in the aromatic nucleus meta with respect to one another, such as resorcinol, phloroglucinol, orcinol, pyrogallol, and the like are preferred. Mixtures of phenolic compounds can be employed, with mixtures of polyhydric phenols and monohydroxy alkyl phenols being especially preferred.

Representative aldehydes which can be condensed with phenolic compounds to form novolak resins include, without being limited thereto, formaldehyde, acetaldehyde, propionaldehyde, isobutyraldehyde, 2-ethylbutyraldehyde, 2-methylpentaldehyde, 2-ethylhexaldehyde, as well as compounds which decompose to formaldehyde, such as paraformaldehyde, trioxane, furfural, hexamethylenetetramine, acetals which liberate formaldehyde on heating, benzaldehyde, and the like.

While any phenolic novolak resin, or mixtures of such resins, can be employed in the practice of the invention, it is preferred that the novolak resin component of the herein-described adhesion promoter systems comprise:

from about 40 to 100, preferably about 70 to 100, weight percent of at least one novolak resin selected from the group consisting of (1) novolak resins wherein the phenolic precursor is a polyhydric phenol or a mixture of such phenols (hereinafter called polyhydric novolak), (2) novolak resins wherein the phenolic precursor comprises from about 70 to about 98, preferably about 75 to about 98, mol percent of at least one polyhydric phenol and from about 30 to about 2, preferably from about 25 to about 2, mol percent of at least one monohydric phenol (hereinafter called polyhydric-monohydric novolak), and mixtures thereof; and from zero to about 60, preferably zero to about 30, weight percent of at least one novolak resin wherein the phenolic precursor is a monohydric phenol or a mixture of such phenols (hereinafter called monohydric novolak); said weight percents being based on total weight of novolak resin component and said mol percents being based on total mols of phenolic precursor. Preferably, the monohydric phenols are alkyl-substituted phenols such as nonyl phenol and cashew nut shell liquid. In preferred embodiments, the novolak resin comprises 100 weight percent of polyhydric novolak, polyhydric-monohydric novolak, or mixtures thereof. Suitable phenolics include resinous oils as well as pulverulent resins.

The epoxy resin component of the adhesion promoting compositions of the invention can be broadly described as any organic material which has a plurality, i.e., more than 2, of reactive 1,2-epoxy groups. Such epoxy materials can be monomeric or polymeric, saturated or unsaturated, aliphatic, cycloaliphatic, aromatic, or heterocyclic, and they may be substituted with substituents other than epoxy groups, such as hydroxyl groups, ether radicals, halogen atoms, and the like. Representative epoxy materials include, without limitation thereto, epoxy polyethers obtained by reacting an epihalohydrin with a polyhydric phenol or a polyhydric alcohol; polyepoxypolyhydroxypolyethers obtained by reacting a polyepoxide with a polyhydric phenol or a polyhydric alcohol; epoxy novolaks; and the like. Particularly preferred epoxy compounds are selected from the group consisting of cycloaliphatic and heterocyclic polyglycidyl compounds, with polyglycidyl derivatives of isocyanuric acid being particularly preferred. Particular details of epoxy compounds which can be employed in the practice of the invention can be found in U.S. Pat. Nos. 2,633,548; 2,872,487; 2,884,408; 3,337,509; and 3,759,914; inter alia, and also in Lee and Neville, "Handbook of Epoxy Resins," McGraw-Hill Book Co., New York, N.Y. (1967).

It is a critical feature of the invention that the crosslinking component of the herein described adhesion promoter compositions comprise at least one crosslinking agent for phenolic novolak resins. As previously noted, novolak resins can be converted to an infusible state by the addition thereto of a crosslinking agent such as a methylene donor. Representative of the methylene donors which can be employed in the practice of the invention are, without limitation thereto, hexamethylenetetramine, trimeric methyleneaminoacetonitrile, paraformaldehyde, s-trioxane, anhydroformaldehydeaniline, ethylenediamine formaldehyde, methylol derivatives of urea, methylol derivatives of melamine, butyraldehyde, N,N',N''-trisubstituted cyclotrimethane triamines, N-substituted-N'-disubstituted diaminomethanes, N,N'-disubstituted imidazolines, N,N'-disubstituted hexahydropyrimidines, N-(substituted oxymethyl) derivatives of 1,3-imidazolidine-2-ones, N-(substituted oxymethyl) derivatives of 1,3-imidazolidine-2-thiones, N-(substituted oxymethyl) derivatives of melamine such as hexamethyoxymethylmelamine, 5-substituted-1-aza-3,7-dioxabicyelo [3.3.0] octanes such as 1-aza-3,7-dioxa-5-hydroxymethylbicyclo [3.3.0] octane, azomethines having the formula

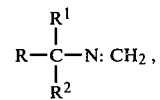

wherein R, $R^1$ and $R^2$ are the same or different and each is an alkyl radical having from 1-8 carbon atoms; and methylolated nitroalkanes such as trimethylolnitromethane, 1,1-dimethylol-1-nitroethane, 1,1-dimethylolnitropropane, 2-methylol-2-nitropropane, tris (acetoxymethyl)nitromethane, and 1,1-bis(acetoxymethyl)-1-nitropropane. These compounds are considered methylene donors in that they effect rapid crosslinking of novolak resins through methylene or equivalent linkages at elevated temperatures.

Particularly preferred crosslinking agents are dual functional methylene donors, i.e., compounds which can provide the requisite methylene moiety which is effective to cause crosslinking of the novolak resin and, as well, a moiety which is effective to cause crosslinking of epoxy compounds. Such dual-function crosslinking agents are typified by hexamethylenetetramine, ethylenediamine formaldehyde, azomethines, and the like. Hexamethylenetetramine is the presently preferred crosslinking agent.

Additionally, the adhesion promoting additives of the present invention can contain epoxy resin hardeners capable of hardening epoxide compounds. These are usually substances which are capable of forming polyadducts with epoxide compounds or to start a ring opening polymerization. Preferably, so-called heat hardeners for example, carboxylic acid anhydrides or specific nitrogen compounds which contain hydrogen atoms bonded at least actively to nitrogen are employed. These so-called heat hardeners are solids at ambient temperatures. Preferably, the epoxide resin hardeners will be dual functional compounds which provide moieties capable of not only hardening the epoxy compounds but also are methylene donors which can effect cross-linking of novolak resins.

In forming the adhesion promoter compositions of the present invention, the methylene donor crosslinking agent will be employed in the range from about 0.1 to about 4, preferably about 0.5 to about 2, parts by weight per part by weight of novolak resin, with the polyepoxide component being present in an amount in the range of from 0.2 to about 8, preferably 1 to 6, parts by weight per part by weight of novolak resin.

The novolak resin-methylene donor crosslinking agent-polyepoxide adhesion promoter compositions of this invention are readily obtained by homogeneously blending the components preferably in the presence of a diluent such as a plasticizer for organic polymers, e.g. dioctylphthalate or diisodecyl phthalate, at approximately 20° to 60° C. by means of well-known mixing or blending apparatus such as a planetary mixer, a Banbury mixer, a sigma blade mixer, and the like to afford a smooth cream-like homogeneous dispersion. If desired, the individual components can first be dispersed into an appropriate carrier vehicle and subsequently combined into a homogeneous dispersion. The resulting blend will have a liquid to solid particulate consistency. The term "liquid" denotes a wide range of viscosity characteristics; in other words, a liquid composition may be highly fluid or just barely pourable. The resulting blends exhibit an indefinite shelf-stability.

As noted, the invention further contemplates a two-pack adhesion promoter system comprising methylene donor-methylene acceptor-epoxy resin. While such systems are effective to enhance adhesion between organic polymeric materials and substrate surfaces, these systems have a limited storage stability and are preferably kept separated until just prior to use. In such systems, substantially any aromatic phenol, preferably aromatic phenols having at least two hydroxy groups, can be employed as the methylene acceptor. The methylene donor can be any of those previously set forth, with hexamethylenetetramine being presently preferred. Any epoxy compound having at least two epoxy groups can be employed in the practice of this embodiment of the invention, with polyglycidyl derivatives of isocyanuric acid being presently preferred.

The two-pack adhesion promoter systems of the invention can be easily prepared by combining into a first pack the methylene donor and the epoxide resin. The second pack thus will comprise the methylene acceptor component. In forming these systems, the methylene donor will be present in at least a stoichiometric amount. The amount of epoxide compound will be in the range from about 0.2 to about 8, preferably about 1 to about 6, parts by weight per part by weight of aromatic phenol.

The adhesion promoter systems of the present invention are particularly useful for improving the adhesion of organic high polymers, subsequently referred to as host polymers, to a variety of rigid and non-rigid substrates, including metals, natural and synthetic organic and inorganic fibers, natural and synthetic elastomers, formed plastic substrates, and the like. The host polymers which can be treated in accordance with the invention comprise any hydrogen-containing organic high polymer, the term "high polymer" being used to designate any of the plastic materials which are solid at normal temperatures. The invention is particularly applicable to the treatment of host polymers which are normally difficult to bond with other materials such as, for example, polyesters; vinyl resins; copolymers of α-methylstyrene with acrylate esters, methacrylate esters, acrylonitrile, and the like; polyacrylates; polymethacrylates; polystyrene; polyamides; polyurethanes; cellulose resins; and the like.

The compositions of the present invention are particularly useful for improving the adhesion of vinyl polymer plastisol and organosol compositions and of dry vinyl polymer powders to rigid and non-rigid substrates. The vinyl halide polymers includes the thermoplastic, resinous homopolymers of vinyl chloride, vinyl bromide and vinyl fluoride. Also included within the scope of vinyl halide polymers and collectively referred to herein as vinyl halide polymers or polyvinyl halide resins are the resinous copolymers of one of the aforesaid vinyl halides with a monomer containing a single vinyl group copolymerizable therewith, wherein the vinyl halide constituent units comprise at least 50 percent of the copolymers. Preferred monolefinically unsaturated copolymerizable monomers include such compounds as vinylidine chloride, the vinyl ethers, the vinyl esters, especially vinylacetate and the like. The vinyl chloride homopolymers and copolymers are the most preferred resins embodied herein.

The adhesion promoter compositions are compounded into the host polymer-containing compositions, utilizing any of the well-established procedures for effecting such incorporation. For example, dry powder compositions can be prepared by conventional dry blending methods wherein the individual constituents are agitated in the presence of a small amount of fluid additive. Fluid compositions such as plastisols and organosols are also obtained by conventional means by homogeneously blending the components by means of well-known mixing means such as planetary mixer, Banbury mixer, sigma blade mixer, and the like, to afford a homogeneous dispersion. In the case of the novolak-methylene donor-epoxy one-pack systems, it is preferred to predisperse such systems in an appropriate carrier fluid prior to blending the adhesion promoter composition with the host polymer-base composition. When employing the two-pack system, the individual components are preferably each individually dispersed into an appropriate carrier fluid and each is then preferably sequentially added in any order to the host polymer-based composition. Alternatively, the epoxy resin and methylene donor components are combined in a first dispersion and the aromatic phenolic (methylene acceptor) is separately dispersed; the separate dispersions are then sequentially combined in any order into the host polymer composition. In addition to fluid additives such as plasticizers and the like, conventional additives normally employed with dry powder, plastisol and organosol compositions, such as stabilizers, pigments, fillers and the like, can be included in the host polymer-adhesion promoter compositions.

In accordance with the invention, the adhesion promoter systems will be incorporated into host polymer compositions to afford compositions comprising:
(a) 100 parts by weight of host polymer;
(b) zero to about 400 parts by weight per 100 parts by weight per 100 parts by weight of host polymer of a plasticizer for said host polymer; and
(c) from about 1 to about 40, preferably about 1 to about 24, more preferably about 2 to about 12, parts by weight per 100 parts by weight of host polymer of adhesion promoter system selected from the group of (i) novolak resin-methylene donor-epoxide compound having at least two epoxy groups, and (ii) methylene acceptor-methylene donor-epoxide compound having at least two epoxy groups: wherein the relationship among the components of said adhesion promoter system is as herein described.

The adhesion promoter system-containing host polymer compositions of this invention are especially suited for the production of coatings, laminated materials, and the like. They can be applied to substrate materials by such well-known operations as spread-coating, dipping, extruding and molding. Such compositions are also useful as adhesives, particularly for fiber-to-fiber and fiber-to-metal applications. Curing of the compositions is effected by heating at a temperature in the range from about 120° C. to about 205° C., preferably about 10 to 30 minutes.

The examples which follow are presented to illustrate and clarify the invention and should not be interpreted so as to limit the invention, since variations and modifications of the invention will be obvious to those skilled in the art and can be made without departing from the spirit and scope thereof. In the examples, the amounts of ingredients are given in parts by weight unless otherwise indicated.

EXAMPLE I

Separate dispersions are prepared by milling in a steel ball mixer the following ingredients until a smooth homogeneous dispersion is obtained:

| Dispersion Ingredient PBW (parts by weight) | A | B | C |
| --- | --- | --- | --- |
| Triglycidyl isocyanurate | 100 | — | — |
| Hexamethylenetetramine | — | 100 | — |
| Resorcinol | — | — | 100 |
| Diisodecylphthalate | 200 | 200 | 200 |

Dispersions A, B and C are employed to formulate two-pack adhesion promoter systems I and II. System I is prepared by mixing in a jiffy mill requisite portions of Dispersions A and B to form Pack 1 of said System I; in the case of System II, Dispersions B and C are blended in a jiffy mill to provide Pack 1 of System II:

| Adhesion Promoter System | I | | II | |
| --- | --- | --- | --- | --- |
| Pack | 1 | 2 | 1 | 2 |
| Ingredients, PBW | | | | |
| Triglycidyl isocyanurate | 100 | | | 100 |
| Hexamethylenetetramine | 100 | | 100 | |
| Resorcinol | | 100 | 100 | |
| Diisodecylphthalate | 400 | 200 | 400 | 200 |

The initial viscosity of Pack 1, System 2 is 1050 cps (No. 3 spindle at 60 rpm). After 24 hrs., the viscosity of Pack 1, System 2 is 3840 cps (No. 3 spindle at 30 rpm).

A vinyl resin dispersion is prepared by mixing in a jiffy mill vinyl resin homopolymer (Bakelite QYNV, a dispersion grade homopolymer of vinyl chloride, available from Union Carbide) and plasticizer as follows:

| | PBW |
| --- | --- |
| Polyvinyl chloride | 100 |

-continued

| | PBW |
| --- | --- |
| Diisodecylphthalate | 60 |

In a jiffy mill, a vinyl plastisol is prepared by adding sequentially Pack 2 of System II and Pack 1 of System II to the vinyl dispersions to provide compositions as follows:

| Vinyl Plastisol Ingredients, PBW | A | B | C |
| --- | --- | --- | --- |
| Polyvinyl chloride | 100 | 100 | 100 |
| Resorcinol | 0.43 | 0.86 | 1.72 |
| Hexamethylenetetramine | 0.50 | 1.0 | 2.0 |
| Triglycidyl isocyanurate | 1.07 | 2.14 | 4.28 |
| Diisodecylphthalate | 64.4 | 68.8 | 77.6 |

The formulated plastisols are applied (1.27 mm wet film thickness) to a solvent-wiped steel panel, one half of which is masked with adhesive tape. The coated panels are cured at 149° C. at cure times of 5 minutes, 30 minutes and one hour. Following the cure cycle, the panels are quenched in tap water. After an aging period of 24 hours, 2.54 cm strips are pulled at an angle of 180° using an Instron tester. The results are reported in Table I (peel strengths are reported in lbs. per linear inch, pli, as the average of four test panels).

TABLE I

| Vinyl plastisol Fusion cycle | A | B | C |
| --- | --- | --- | --- |
| 15 min @ 144° C. | 1.3 | 4.6 | 7.1 |
| 30 min @ 149° C. | 2.4 | 7.4 | 7.8 |
| 60 min @ 149° C. | 6.6 | 8.8 | 8.8 |

The foregoing data demonstrate that two-pack adhesion promoter systems prepared in accordance with the invention are effective to enhance bonding of high organic polymer compositions to substrate surfaces. As can be seen from the data, excellent adhesion is obtained using the two-pack systems of this invention.

EXAMPLE II

Preparation of phenolic novolak resin

Two hundred parts by weight of resorcinol and 10.3 parts by weight formaldehyde (37% formalin solution) are charged to a reactor and heated until the resorcinol dissolves. There is added 0.4 parts by weight hexamethylenetetramine and 17.2 parts by weight formaldehyde (37% formalin solution). The mixture is heated at 95° C. for 45 minutes, cooled to 60° C. and dried under vacuum. The resulting dry novolak resin is pulverized.

Preparation of organic polymer composition

Sixty parts by weight of diisodecylphthalate and 100 parts by weight of homopolymer of vinyl chloride (Bakelite QYNV, dispersion grade vinyl chloride homopolymer, Union Carbide Company) are blended in a jiffy mill until a smooth homogeneous dispersion is obtained.

Preparation of adhesion promoter system

Following the procedure of Example I, individual dispersions are prepared by milling in a steel ball mill the following ingredients until a smooth homogeneous dispersion is obtained:

| Dispersion Ingredient, PBW | A | B | C |
|---|---|---|---|
| Triglycidyl isocyanurate | 100 | — | — |
| Hexamethylenetetramine | — | 100 | — |
| Novolak resin (Example II) | — | — | 100 |
| Diisodecylphthatate | 200 | 200 | 200 |

In a jiffy mill, dispersions A, B and C are combined with mixing to form a smooth homogeneous dispersion having the following composition:

|  | PBW |
|---|---|
| Triglycidyl isocyanurate | 400 |
| Novolak resin (Example II) | 200 |
| Hexamethylenetetramine | 200 |
| Diisodecylphthalate | 1600 |

The thus-prepared adhesion promoter system of the invention is mixed with the vinyl resin composition of this example in a jiffy mill to afford a vinyl plastisol composition having the recipe:

| Plastisol Composition | PBW |
|---|---|
| Polyvinyl chloride | 100 |
| Triglycidyl isocyanurate | 4 |
| Novolak resin (Example II) | 2 |
| Hexamethylenetetramine | 2 |
| Diisodecylphthalate | 76 |

Following the procedure of Example I, the thus-formulated plastisol is coated onto solvent-wiped steel panels and cured according to the schedule:

| 135° C.: | 20 min, 40 min, 80 min |
| 149° C.: | 20 min, 40 min, 80 min |
| 163° C.: | 10 min, 20 min, 40 min |
| 177° C.: | 10 min, 20 min, 40 min |
| 191° C.: | 5 min, 10 min, 20 min |
| 204° C.: | 5 min, 10 min, 20 min |

After curing, the panels are quenched in cold water, aged for 24 hours at room temperature and tested for peel strength following the procedure of Example I. The results are reported in Table II (peel strength in lbs/in, average of 2 test panels).

TABLE II

| Cure time, minutes | Peel Strength, Pli | | | | |
| Cure temperature | 5 | 10 | 20 | 40 | 80 |
|---|---|---|---|---|---|
| 135° C. | — | — | 1.80 | 2.05 | 3.00 |
| 149° C. | — | — | 5.40 | 7.20 | 8.95 |
| 163° C. | — | 6.8 | 9.85 | 14.15 | — |
| 177° C. | — | 10.4 | 16.35 | 20.65 | — |
| 191° C. | 9.1 | 15.2 | 27.1 | — | — |
| 204° C. | 13.2 | 25.6 | 7.2 | — | — |

All samples cured at 204° C. are discolored and the sample cured at 204° C. for 20 minutes shows extensive corrosion of the metal substrate.

The data demonstrate the efficacy of the adhesion promoter systems of this invention to provide strongly adherent coatings over a wide temperature range.

EXAMPLE III

Ninety seven parts by weight resorcinol, 3 parts by weight nonyl phenol and 15.2 parts by weight formaldehyde (37% formalin solution) are charged to a reactor and heated until the ingredients are dissolved. There is added to the mixture 0.2 parts by weight of hexamethylenetetramine and 8.4 parts by weight of formaldehyde (37% formalin solution). The mixture is heated at 95° C. for one hour, cooled to room temperature and dehydrated at 10 mm Hg at 135° C. The resulting dry resorcinol (98 mol%)/nonyl phenol (2 mol %) novalak resin is pulverized.

Coating compositions are prepared by blending in a jiffy mill the following ingredients until homogeneous dispersions are obtained:

| Composition | A | B | C | D | E |
|---|---|---|---|---|---|
| Polyvinyl chloride (Bakelite QYNV) | 100 | 100 | 100 | 100 | 100 |
| Triglycidyl isocyanurate | 6.4 | 4.8 | 3.2 | 1.6 | 0 |
| Resorcinol/nonyl phenol novolak (Ex. III) | 1.02 | 2.03 | 3.05 | 4.06 | 4 |
| Hexamethylenetetramine | 0.58 | 1.17 | 1.75 | 2.34 | 4 |
| Dioctyphthalate | 76 | 76 | 76 | 76 | 76 |

Following the procedure of Example I, the thus-prepared compositions are coated onto solvent-wiped steel panels and cured at 149° C. for 30 minutes. The coatings are tested for peel strength following the procedure of Example I. The results are reported in Table III.

TABLE III

| Composition | Peel Strength, Pli |
|---|---|
| A | 0.06 |
| B | 0.09 |
| C | 1.1 |
| D | 8.6 |
| E | 8.8 |

The data demonstrate the utility of polyhydric-monohydric novolak resins in forming adhesion promoter systems in accordance with the invention. Composition E, which contains no epoxide compound is well adhered to the metal substrate but is noticeably foamed.

EXAMPLE IV

In a jiffy mill, vinyl plasticols are prepared by mixing the following ingredients until a homogeneous dispersion is obtained:

| Plastisol Ingredients, PBW | A | B | C | D | E |
|---|---|---|---|---|---|
| Polyvinyl chloride | 100 | 100 | 100 | 100 | 100 |
| Triglycidyl isocyanurate | 8 | 6 | 4 | 2 | 0 |
| Resorcinol (100%) novolak | 0 | 1 | 2 | 3 | 4 |
| Hexamethylenetetramine | 0 | 1 | 2 | 3 | 4 |
| Diisodecylphthalate | 76 | 76 | 76 | 76 | 76 |
| Weight percent triglycidyl isocyanurate | 100 | 75 | 50 | 25 | 0 |

Following the procedure of Example I, solvent-wiped steel substrates are coated with the described compositions. The coated panels are fused at the conditions of 30 minutes at 149° C., 5 minutes at 204° C. and 20 minutes at 204° C. Peel strengths are determined and reported (Table IV) according to the procedure of Example I.

TABLE IV

| Plastisol | Peel Strength, Pli | | | | |
|---|---|---|---|---|---|
| Fusion conditions | A | B | C | D | E |
| 149° C., 30 min | 0.0 | 4.2 | 4.3 | 4.4 | 3.83 |
| 204° C., 5 min | 0.0 | 5.48 | 9.63 | 4.45 | 8.78 |
| 204° C., 20 min | 6.88 | 14.65 | 0.0 | 0.0 | 0.0 |

The data demonstrate (1) the unexpected results which are provided by the adhesion promoter systems of the invention and, (2) the necessity that there be present in such systems each of the stated ingredients. It should be noted that composition E, which contains no epoxide compound, tends to discolor, particularly at the higher cure temperature and at 204° C., foams badly and causes corrosion of the substrate. The quality of coatings cured at 204° C. for 20 minutes is inferior, even though adhesion is quite good for compositions A and B. Compositions C-E afforded films which were substantially entirely degraded upon curing at 204° C. for 20 minutes, indicating the cure cycle is too severe.

EXAMPLE V

The following ingredients are combined in a jiffy mill to form homogeneous dispersions:

| Dispersion Ingredient, PBW | A | B | C |
|---|---|---|---|
| Polyvinyl chloride (Geon 124) | 100 | 100 | 100 |
| Resorcinol novolak (SRF 1501) | 1.46 | 1.34 | 1.14 |
| Hexamethylenetetramine | 0.72 | 1.34 | 2.28 |
| Triglycidyl isocyanurate | 5.82 | 5.32 | 4.58 |
| Diisodecylphthalate | 76 | 76 | 76 |

The dispersions are coated onto solvent wiped steel panels following the procedure of Example I. Test panels are fused at 149° C. and 204° C. for 30 minutes and 5 minutes, respectively, and the peel strength in pounds per linear inch are determined in the same manner as in Example I. The results are reported in the following table:

| Dispersion | A | B | C |
|---|---|---|---|
| Ratio, Hexamethylenetetramine-novolak | 0.5 | 1 | 2 |
| Peel strength, pli | | | |
| Fused 30 min @ 149° C. | 0.2 | 2.0 | 6.9 |
| Fused 5 min @ 204° C. | 1.9 | 17.1 | 6.2 |

EXAMPLE VI

Homogeneous dispersion of the following ingredients are prepared:

| Dispersion Ingredients, PBW | D | E | F |
|---|---|---|---|
| Polyvinyl chloride (Geon 124) | 100 | 100 | 100 |
| Resorcinol novolak (SRF-1501) | 1.27 | 1.23 | 1.19 |
| Hexamethylenetetramine | 1.65 | 1.85 | 2.03 |
| Triglycidyl isocyanurate | 5.08 | 4.93 | 4.77 |
| Diisodecylphthalate | 76 | 76 | 76 |

The dispersions are coated onto solvent-wiped steel panels, fused and tested for peel strength following the procedure of Example I. The results are reported in the following table:

| Dispersion | D | E | F |
|---|---|---|---|
| Ratio, Hexamethylenetramine:novolak | 1.3 | 1.5 | 1.7 |
| Peel strength, pli | | | |
| Fused 30 min at 149° C. | 14.6 | 17.2 | 9.2 |
| Fused 5 min at 204° C. | 18.0 | 22.8 | 4.7 |

The data of Examples V and VI further demonstrate that the combination of novolak resin, methylene donor and epoxide compound interact together to product clearly unobvious results with respect to improving the adhesion of host polymers to substrate surfaces. In both Example V and Example VI, the weight ratio of epoxide compound to novolak resin is 4:1.

EXAMPLE VII

Coating compositions are prepared by mixing in a jiffy mill the following ingredients to obtain homogeneous dispersions:

| Composition | A | B | C |
|---|---|---|---|
| Bakelite QYNV[a] | | | 100 |
| Bakelite VLFV[b] | | 100 | |
| Geon 124[c] | 100 | | |
| Resorcinol Novolak (Ex. II) | | | 1 |
| SRF-1501 Novolak[d] | 1.23 | 1.23 | |
| Hexamethylenetetramine | 1.85 | 1.85 | 2 |
| Triglycidyl isocyanurate | 4.92 | 4.92 | 4 |
| Diisodecylphthalate | 76 | 76 | 76 |

[a] ®, Union Carbide Co., dispersion grade homopolymer of vinyl chloride.
[b] ®, B. F. Goodrich Chemical Co., dispersion grade homopolymer of vinyl chloride.
[c] ®, Union Carbide Co., dispersion grade copolymer of vinyl chloride and vinyl acetate.
[d] ®, Schenectady Chemical Co., resorcinol/formaldehyde novolak resin.

The compositions are coated onto steel panels according to the procedure of Example I. The coatings are fused at various conditions of time and temperature and tested following the procedure of Example I. Peel strengths in pounds per linear inch (pli) are repeated in Table VII.

TABLE VII

| Composition A | Peel Strength, Pli | | | | | | | |
|---|---|---|---|---|---|---|---|---|
| Cure, time, minutes | 5 | 10 | 20 | 30 | 40 | 60 | 80 | 90 |
| Cure temperature, °C. | | | | | | | | |
| 149 | | | | 10.4 | | 11.5 | | 11.8 |
| 163 | | | 19.5 | | 20.1 | | 16.6 | |
| 177 | | 19.3 | 20.0 | | 22.7 | | | |
| 191 | | 4.2 | 2.9[a] | | b | | | |
| 204 | 15.5 | 4.3 | 3.0[a] | | | | | |
| 218 | 3.4 | 7.3 | b | | | | | |

[a] degraded
[b] highly degraded

| Composition B | Peel Strength, Pli | | |
|---|---|---|---|
| Curing time, minutes | 30 | 60 | 90 |
| Cure temperature, °C. | | | |
| 107 | 0.9 | 1.02[a] | 1.2[a] |
| 121 | 3.9 | 3.5[b] | 3.1 |
| 135 | 11.0 | 10.2 | 11.4 |
| 149 | 15.3 | 16.7 | 19.2 |
| 163 | 20.4[a] | 18.4 | 16.2 |

[a] stock break
[b] average of 2 test panels only. Adhesion on 2 test panels such that coating could not be pulled from substrate.

| Composition C | |
|---|---|
| Cure cycle: | Peel Strength, Pli |

TABLE VII-continued

| 60 min @ 135° C. | 3.1 |
|---|---|
| 30 min @ 149° C. | 3.6 |
| 5 min @ 204° C. | 18.3 |

The data further demonstrate the utility of the herein described adhesion promoter systems over a wide range of curing or fusion conditions.

EXAMPLE VIII

Coating compositions are prepared by mixing in a jiffy mill the following ingredients to obtain homogeneous dispersions:

| Composition | A | B | C | D | E |
|---|---|---|---|---|---|
| Ingredients | | | | | |
| Vinyl resin[a] | 100 | 100 | 100 | 100 | 100 |
| Novolak[b] | 1.23 | 1.23 | 1.23 | 1.23 | 1.23 |
| Hexamethylene-tetramine | 1.83 | 1.83 | 1.83 | 1.83 | 1.83 |
| Araldite ECN 1299[c] | 4.93 | — | — | — | — |
| Araldite 6010[d] | — | 4.94 | — | — | — |
| Araldite 6071[e] | — | — | 4.93 | — | — |
| Epon 871[f] | — | — | — | 4.94 | — |
| Epon 1031[g] | — | — | — | — | 4.93 |
| Diisodecylphthalate | 76 | 71 | 76 | 71 | 76 |

[a] Geon 124
[b] SRF-1501
[c] TM, Ciba Products Co., polyglycidyl ether of ortha-cresol/formaldehyde novolak epoxide
[d] TM, Ciba Products Co., liquid diglycidylether/bis-phenol A epoxide
[e] TM, Ciba Products Co., solid diglycidylether/bis-phenol A epoxide
[f] TM, Shell Chemical Co., diglycidyl ester of linoleic dimer acid
[g] TM, Shell Chemical Co., tetrafunctional polyglycidyl ether of tetraphenylene The compositions are coated onto steel panels and tested according to the procedure of Example I. Peel strength (pli) are as follows:

| Composition | A | B | C | D | E |
|---|---|---|---|---|---|
| Fusion conditons | | | | | |
| 30 min @ 149° C. | 9.5 | 12.4 | 9.3 | 2.9 | 9.7 |

The data demonstrate the utility of polyepoxide compounds widely in the adhesion promoter systems of the invention.

EXAMPLE IX

The following ingredients are combined to form a smooth homogeneous dispersion having the following composition:

| | PBW |
|---|---|
| Triglycidyl isocyanuarate | 200 |
| Novolak resin (Ex. II) | 100 |
| Hexamethylenetetramine | 100 |
| Diisodecylphthalate | 800 |

The stability at room temperature of the thus-prepared adhesion promoter system is monitored over a 2 months period with the following results (Brookfield Viscometer, #3 spindle):

| RPM | 6 | 12 | 30 |
|---|---|---|---|
| Time: | | | |
| Initial | 3600 | 2500 | 1620 |
| 1 day | 5300 | 3650 | 2540 |
| 5 days | 2700 | 1850 | 1200 |
| 1 week | 4400 | 3050 | 2080 |
| 2 weeks | 4200 | 3050 | 2360 |
| 1 month | 2700 | 2550 | 1960 |
| 2 months | 5500 | 4400 | 3280 |

The data demonstrate the excellent long-term storage stability of the adhesion promoter systems of the invention.

EXAMPLE X

Compositions according to the following recipes are prepared by mixing the ingredients in a jiffy mill until a smooth homogeneous dispersion is obtained:

| Composition | A | B |
|---|---|---|
| Ingredients | | |
| Bakelite QYNV vinyl resin | 100 | 100 |
| Novolak resin (Example II) | 2 | 0 |
| Hexamethylenetetramine | 2 | 0 |
| Triglycidyl isocyanurate | 4 | 21.6 |
| Melamine | 0 | 2.4 |
| Diisodecylphthalate | 76 | 60 |

The compositions are coated onto steel panels as follows in the manner of Example I:
Panel A: Solvent-wiped steel
Panel B: Non-solvent wiped steel
Panel C: 10% motor oil in xylene coated steel
Panel D: Zinc phosphate coated steel
Panel E: Chrome oxide coated aluminum The coated panels are fused, cooled and tested according to the procedure of Example I with the following results:

| | Peel Strength, Pli | | | | |
|---|---|---|---|---|---|
| Test Panel | A | B | C | D | E |
| Fusion conditions | | | | | |
| 30 min @ 149° C. | | | | | |
| Composition A | 2.6 | 2.5 | 2.6 | 4.6 | 2.9 |
| Composition B | 0.1 | 0.0 | 0.0 | 0.0 | 0.0 |
| 5 min @ 204° C. | | | | | |
| Composition A | 12.8 | 12.3 | 8.2 | 6.4 | 24.2 |
| Composition B | 0.0 | 0.0 | 0.0 | 0.0 | 0.1 |

The data demonstrates that the adhesion promoter systems of the invention provide strongly adherent coatings with treated and untreated substrates.

EXAMPLE XI

A composition is prepared according to the recipe:

| | PBW |
|---|---|
| Bakelite VLFV vinyl resin | 100 |
| SRF-1501 novolak | 1.28 |
| Hexamethylenetetramine | 1.92 |
| Triglycidylisocyanurate | 5.13 |
| Diisodecylphthalate | 46.67 |
| Methyl ethyl ketone | 650 |

The composition is employed to adhesively bond polyamide fabric-polyamide fabric and polyester fabric-polyester fabric. In each instance, the composition is coated onto the fabric, dried and the adhesive-coated surfaces are mated. The assembly is fused at 163° C. for 15 minutes. After cooling to room temperature, the adhesive bond is tested according to ASTM D-429-C, modified to 45°. The polyamide-polyamide bond strength is 105 psi and the polyester-polyester bond strength is 60 psi, thereby demonstrating the utility of the herein described adhesion promoter system-containing organic polymer compositions as adhesive materials.

What is claimed is:

1. A two-package adhesion promoting composition comprising
    a first pack consisting essentially of triglycidyl isocyanurate and at least one crosslinking agent comprising at least one methylene donor; and
    a second pack consisting essentially of at least one methylene acceptor selected from the group consisting of monomeric polyhydric phenols, monomeric monohydric alkyl phenols and mixtures thereof;
    wherein the amount of triglycidyl isocyanurate is in the range from about 0.2 to about 8 parts by weight per part by weight of methylene acceptor and said methylene donor is present in at least a stoichiometric amount, based on methylene acceptor.

2. A composition according to claim 1 wherein said methylene donor comprises at least one nitrogen-containing compound.

3. A composition according to claim 2 wherein said methylene donor comprises hexamethylenetetramine.

4. A composition according to claim 2 wherein said methylene acceptor comprises resorcinol.

5. A composition according to claim 4 wherein said methylene donor comprises hexamethylenetetramine.

* * * * *